(12) United States Patent
Rubin (10) Patent No.: US 10,346,395 B2
(45) Date of Patent: Jul. 9, 2019

(54) RANDOMIZATION AND INFORMED SEARCH FOR CYBER ATTACK PROTECTION

(71) Applicant: SPAWAR Systems Center Pacific, San Diego, CA (US)

(72) Inventor: Stuart Harvey Rubin, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 387 days.

(21) Appl. No.: 15/228,838

(22) Filed: Aug. 4, 2016

(65) Prior Publication Data
US 2017/0039374 A1 Feb. 9, 2017

Related U.S. Application Data (60) Provisional application No. 62/201,682, filed on Aug. 6, 2015.

(51) Int. Cl.
*G06F 11/00* (2006.01)
*G06F 12/14* (2006.01)
(Continued)

(52) U.S. Cl.
CPC .......... *G06F 16/245* (2019.01); *G06F 21/52* (2013.01); *G06F 21/554* (2013.01); *G06F 2221/033* (2013.01)

(58) Field of Classification Search
None
See application file for complete search history.

(56) References Cited

U.S. PATENT DOCUMENTS 6,226,627 B1* 5/2001 Polak ............... G06F 11/142
706/14
7,047,226 B2 5/2006 Rubin
(Continued)

OTHER PUBLICATIONS

A. Nguyen-Tuong, D. Evans, J. C. Knight, B. Cox and J. W. Davidson, "Security through redundant Data Diversity," 2008 IEEE International Conference on Dependable Systems and Networks With FTCS and DCC (DSN), Anchorage, AK, 2008, pp. 187-196. doi: 10.1109/DSN.2008.4630087.*
(Continued)

*Primary Examiner* — Lynn D Feild
*Assistant Examiner* — Vadim Savenkov
(74) *Attorney, Agent, or Firm* — Naval Information Warfare Center, Pacific; Kyle Eppele; J. Eric Anderson (57) ABSTRACT

A method for protecting a software system against cyber attacks comprising the following steps: subdividing the software system into components, wherein each component maps a set of input vectors to a non-deterministic set of stochastic output vectors; saving the components in a database; testing the software system by associating each component in the database with at least two mutually random input/output (I/O) test vector pairs that serve to map a random input vector to correct a non deterministic output vector; storing I/O test vectors with their respective component, wherein components in satisfaction of their I/O test vectors are valid by definition; and expunging components having invalid output vectors.

18 Claims, 4 Drawing Sheets

(51) Int. Cl.
  *G06F 12/16* (2006.01)
  *G08B 23/00* (2006.01)
  *G06F 16/245* (2019.01)
  *G06F 21/52* (2013.01)
  *G06F 21/55* (2013.01)

(56) References Cited

U.S. PATENT DOCUMENTS

| | | | | |
|---|---|---|---|---|
| 7,234,093 | B2* | 6/2007 | Kadkade | G06F 11/3604 714/741 |
| 7,797,669 | B1* | 9/2010 | Rehof | G06F 11/3668 717/100 |
| 8,073,804 | B1 | 12/2011 | Rubin | |
| 8,103,600 | B1 | 1/2012 | Rubin | |
| 8,117,147 | B1 | 2/2012 | Rubin | |
| 8,239,836 | B1* | 8/2012 | Franz | G06F 11/1487 717/127 |
| 8,250,022 | B1 | 8/2012 | Rubin | |
| 8,280,831 | B1 | 10/2012 | Rubin | |
| 8,315,958 | B1 | 11/2012 | Rubin et al. | |
| 9,146,829 | B1* | 9/2015 | Allen | G06F 11/3668 |
| 9,299,025 | B1 | 3/2016 | Rubin | |
| 9,330,358 | B1 | 5/2016 | Rubin | |
| 9,396,441 | B1 | 7/2016 | Rubin | |
| 2003/0046626 | A1* | 3/2003 | Hand, Jr. | G06F 11/3664 714/738 |
| 2009/0106737 | A1* | 4/2009 | Chockler | G06F 11/3604 717/126 |
| 2009/0208014 | A1* | 8/2009 | Betouin | G06F 7/58 380/277 |
| 2011/0295578 | A1* | 12/2011 | Aldrich | G06F 8/10 703/6 |
| 2013/0340083 | A1* | 12/2013 | Petrica | G06F 11/263 726/25 |
| 2015/0178636 | A1 | 6/2015 | Rubin | |

OTHER PUBLICATIONS

Rubin, S.H., "On randomization and discovery", Information Sciences, vol. 177, pp. 170-191, Jan. 2007.
Chaitin, G.J., "Randomness and Mathematical Proof", Sci. Amer., vol. 232, No. 5, pp. 47-52, 1975.
Solomonoff, "A Formal Theory of Inductive Inference", Information and Control, vol. 7, pp. 1-22, 224-254, 1964.
Rubin, S.H., et al., "Kaser: Knowledge Amplification by Structured Expert Randomization", IEEE Trans. Syst., Man, Cybern.: Part B, vol. 34, No. 6m Dec. 2004, pp. 2317-2329.
Zadeh, L.A., "From Computing with Numbers to Computing with Words . . . ,"IEEE Trans. Ckt. and Systems, vol. 46, No. 1, pp. 105-119, 1999.
V.A. Uspenskii, Gödel's Incompleteness Theorem, Translated from Russian. Moscow: Ves Mir Publishers, 1987.
S. H. Rubin, Unpublished U.S. Appl. No. 15/214,763, Randomization Via Dynamic Representation and Informed Search.
A. Gherbi, R. Charpentier, and M. Couture, "Software Diversity for Future Systems Security," CrossTalk, pp. 10-13, Sep./Oct. 2011.
D. Song, M. Reiter, and S. Forrest, Taking Cues from Mother Nature to Foil Cyber Attacks, NSF PR 03-130, https://www.nsf.gov/od/lpa/news/03/pr031, Nov. 25, 2003.
S. Forrest, A. Somayaji, and D.H. Ackley, "Building Diverse Computer Systems," Workshop on Hot Topics in Operating Systems, pp. 57-72, 1997.
P. Ammann et al.; A Fault Tolerant Approach to Survivability, Computer Security, Dependability, and Assurance: from Needs to Solutions: Proceedings Jul. 7-9, 1998, York, England, Nov. 11-13, 1998, Williamsburg, VA, IEEE Computer Society Press.
Q. Liang and S.H. Rubin, "Randomization for Testing Systems of Systems," Proc. 10th IEEE Intern. Cont Info. Reuse & Integration, Las Vegas, NV, Aug. 10-12, 2009, pp. 110-114.

* cited by examiner

RANDOMIZATION AND INFORMED SEARCH FOR CYBER ATTACK PROTECTION

CROSS-REFERENCE TO RELATED APPLICATION

This application claims the benefit of U.S. Provisional Application No. 62/201,682, filed 6 Aug. 2015, titled "Randomization Via Dynamic Representation and Informed Search."

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 103248.

BACKGROUND OF THE INVENTION

The number of computational devices using embedded software is rapidly increasing and the embedded software's functional capabilities are becoming increasingly complex each year. These are predictable trends for industries such as aerospace and defense, which depend upon highly complex products that require systems engineering techniques to create. We also see consumer products as increasingly relying upon embedded software—such as automobiles, cell phones, PDAs, HDTVs, etc.

Embedded software often substitutes for functions previously realized in hardware such as custom ICs or the more economical, but slower gate arrays; for example, digital fly-by-wire flight control systems have superseded mechanical control systems in aircraft. Software also increasingly enables new functions, such as intelligent cruise control, driver assistance, and collision avoidance systems in high-end automobiles. Indeed, the average car now contains roughly seventy computer chips and 500,000 lines of code—more software than it took to get Apollo 11 to the Moon and back. In the upper-end automobiles, in which embedded software delivers many innovative and unique features, there can be far more code.

However, the great number of source lines of code (SLOC) itself is not a fundamental problem. The main difficulty stems from the ever-more complex interactions across software components and subsystems. All too often, coding errors only emerge after use. Worse still, even good code is increasingly the target of cyber attacks. The software testing process must be integrated within the software creation process—including the creation of systems of systems in a spiral development. This follows because in theory, whenever software becomes complex enough to be capable of self-reference it can no longer be formally proven valid.

Cyber threats are growing in number and sophistication. In theory, it is not possible, in the general case, to produce fault-free software. Attackers have shown the ability to find and exploit residual faults and use them to formulate cyber attacks. Most software systems in use today run substantially similar software. As a result, successful cyber attacks can bring down a large number of installations running similar software. As we share more and more software (e.g., through the cloud), the situation can only get worse. There is a need for a better method for protecting a software system against cyber attacks.

SUMMARY

Disclosed herein is a method for protecting a software system against cyber attacks comprising the following steps. The first step provides for subdividing the software system into components. Each component maps a set of input vectors to a non-deterministic set of stochastic output vectors. The next step provides for saving the components in a database. The next step provides for testing the software system by associating each component in the database with at least two mutually random input/output (I/O) test vector pairs that serve to map a random input vector to correct a non deterministic output vector. The next step provides for storing I/O test vectors with their respective component. Components in satisfaction of their I/O test vectors are valid by definition. The next step provides for expunging components having invalid output vectors.

Another embodiment of the method for protecting a software system against cyber attacks may also be described as comprising the following steps. The first step comprises subdividing the software system into Boolean components and procedural components. The Boolean components return True or False, and the procedural components compute all other functions of the software system. Each component maps a set of input vectors to a non-deterministic set of stochastic output vectors. The next step provides for saving the components and the input and output vectors in a database. The next step provides for providing a library of universal primitive and macro components, wherein input and output (I/O) test vectors and a maximal depth of composition are stored with each component. The next step provides for synthesizing components in satisfaction of the I/O test vectors by chance such that diverse components compute the same function. The next step provides for pairing diverse components that compute the same function as transformation rules, which are saved in a separate base and dynamically ordered using a 3-2-1 skew. The next step provides for verifying that components are free from attack if their I/O synthesis behavior is within a specified tolerance. The next step provides for using Multiple Functional Analogies (MFA) by counting the number of diverse components yielding the same output vector. The next step provides for using Multiple Analogies of Derivation (MAD) by counting an approximate number of recursively enumerable distinct paths leading to the synthesis of each component. The approximate number of recursively enumerable distinct paths is equal to the number of times that a given component is derived—including random and transformational synthesis. The next step involves providing a Relative Validity Metric (RVM) by combining MAD and MFA numbers. The greater the RVM, the more likely the output is to be valid. Validity is associated with an RVM>1. The next step provides for a given component from the software system if a given component has an RVM that is less than 1.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
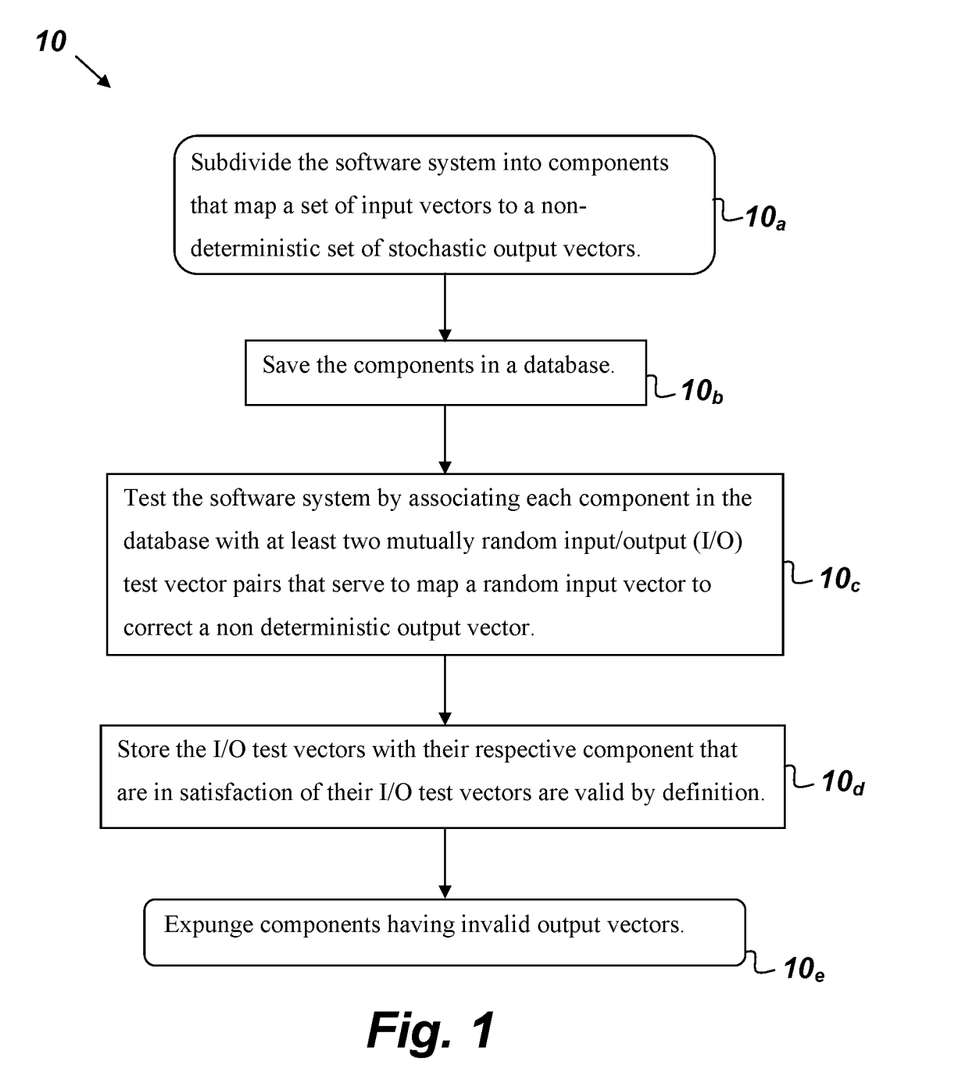
FIG. 1 is a flowchart of a method for protecting a software system against cyber attacks.

FIG. 1 is a flowchart of a method 10 for protecting a software system against cyber attacks. Method 10 comprises, consists of, or consists essentially of the following steps. The first step $10_a$ provides for subdividing the software system into components. Each component maps a set of input vectors to a non-deterministic set of stochastic output vectors. The next step $10_b$ provides for saving the components in a database. The next step $10_c$ provides for testing the software system by associating each component in the database with at least two mutually random input/output (I/O) test vector pairs that serve to map a random input vector to correct a non deterministic output vector. The next step $10_d$ provides for storing I/O test vectors with their respective component. Components in satisfaction of their I/O test vectors are valid by definition. The next step $10_e$ provides for expunging components having invalid output vectors.

A. Redundancy and Diversity in Cyber Defense

Redundancy is effective against hardware faults because such faults are random. However, software faults are typically due to errors of design and/or implementation. This cannot be addressed through redundancy. Software faults are even more serious because they represent opportunities for exploitation by cyber attacks. Most seriously, system security software itself can thus be breached. However, if the system software is built out of a set of diverse, but functionally equivalent components, then a single attack will be insufficient to breach the system. Again, given the same input to the diverse components, whose behavior on this input is known, one would expect the same output. If this is not the case, then a cyber attack may be in progress.

Worms, viruses, and other infectious attacks can be countered by various types of cyber management techniques. The problem stems from the fact that software, which computes the same function does not need to have the same syntax as is currently the case. The existence of the same flaw on many computers is routinely exploited by attackers via Internet worms. Hence, the goal is to introduce more diversity into computer systems. Diversity can be introduced in the software ecosystem by applying automatic program transformation, which maintains the functional behavior and the programming language semantics. In essence, distinct components can compute the same function—insuring computational immunity. Among the technologies that have the potential of mitigating the cyber attack risks, "software redundancy" that includes "component diversity" appears to be one of the rare technologies promising an order-of-magnitude increase in system security. The essential idea is to have software functionality redundantly implemented—preventing an attack against any version from being successful against the remaining versions. This also enables the detection of anomalous behaviors—including the resolution of novel solutions (i.e., by comparing multiple runs), which are not attack-based. The security enhancement, focused on by method 10, pertains to the synthesis and assembly of software components using delimited chance and program transformation. Method 10 may provide a cost-benefit analysis of the protection provided by component diversification based on empirical results.

B. Transformation-Based Diversity

Automatic program transformations can preserve functional behavior and programming language semantics. There are three techniques, in practice, that may be used to randomize code:

1. Instruction Set Randomization (ISR)—This technique changes the instruction set of a processor so that unauthorized code will not run successfully. Cyber attacks can't inject code if they don't know the true instruction set.
2. Address Space Randomization (ASR)—This technique is used to increase software resistance to memory corruption attacks. ASR randomizes different regions of the process address space (e.g., stacks, arrays, strings, etc.).
3. Data Space Randomization (DSR)—This technique defends against memory error attacks by masking and unmasking data so that cyber-corrupted data will not be properly restored—implying unpredictable results, which are detectable. DSR can randomize the relative distance between two data objects, unlike the ASR technique.

C. Combining Redundancy and Diversity

Novel and efficient intrusion detection capabilities such as are provided by method 10 are not achievable using standard intrusion detection techniques based on signatures or malware modeling. Rather an embodiment of method 10 involves the monitoring of a redundant system by comparing the behavior of diverse replicas. Any difference in the output responses of the replicas implies a system failure. Most interestingly, this architecture enables the development of adaptive controllers. Method 10 has been shown to be sophisticatedly adaptive, as will be discussed in more detail below.

D. N-Variant Approaches

If the same input is supplied to a set of diversified variants of the same code, then the cyber attack will succeed on at most one variant—making the attack detectable. The problem with this approach however is that the type of attack must be properly anticipated so that it will succeed on at most one variant. This is increasingly unlikely in today's world.

E. Multi-Variant Code

This technique prevents cyber attacks by using diversity. It executes variants of the same program and compares the behavior of the variants at synchronization points. Divergence in behavior suggests an anomaly and triggers an alarm.

F. Behavioral Distance

One way to beat traditional anomaly-based intrusion detection systems is to emulate the original system behavior (i.e., mimicry attacks). Behavioral distance defends against this by using a comparison between the behaviors of two diverse processes running the same input. A flag is raised if the two processes behave differently.

II. Introduction to Randomization

Consider the following problem, where the assigned task is the lossless randomization of a sequence of integers. Note that a slightly more complex (real-world) task would be to randomize a similar sequence of integers, where the error-metric (tolerance) need not be zero, but is always bounded. Such sequences arise in the need for all manner of prediction (e.g., from the path of an incoming missile to the movement of storm tracks, et al.). This abstraction underpins the novel aspects of the systems employing method 10 (see below).

$$\text{Randomize } n: 0\ 0\ 1\ 4\ 11\ 26\ 57 \quad (1)$$

$$i: 0\ 1\ 2\ 3\ 4\ 5\ 6$$

A randomization of equation (1) is given here by n (i+1)←2n (i)+i. We say that this randomization is lossless because the associated error-metric (e.g., the 2-norm) is zero. Randomizations may or may not exist given the operator, operand set, and the set error-metric bounds. Furthermore, even in cases where randomizations exist, they may not be discoverable in the allocated search time on a particular processor(s). In view of this, the general problem of randomization is inherently heuristic. There is no logic that can solve the inductive inference problem. Rather, one needs to define a search space such that the search operators are adequately informed. The more informed the search operators, the less search that is required (i.e., successful or not). Here is one possible schema to delimit the search space in this problem:

$$n(i+1) \leftarrow M\{*,/,+,-,**\}n(i)\{*,/,+,-\}\{i,n(i-1)\} \quad (2)$$

Partially assigning mnemonics, this schema can be described as follows.

$$n(i+1) \leftarrow \text{int extended-ops}n(i)\text{ops}\{i,n(i-1)\} \quad (3)$$

But, even here, it is apparently ambiguous as to how such a schema might be found. To answer this question, consider the randomization of the even sequence, 2n, and the odd sequence, 2n+1. The randomization of these two sequence definitions is given by 2n+j, j∈{0, 1}. Next, note that "+" ⊂ ops ⊂ extended-ops. Each replacement, at the right, represents a level of generalization. Generalizations are not made—except to randomize two or more instances. For example, if the odd sequence were defined by 2n−1, then a first-level randomization (i.e., based on the given mnemonics) of 2n+1 and 2n−1 is given by 2n ops 1. Having multiple mnemonics can greatly enlarge the search space and result in intractable solutions. An evolutionary approach to reducing the implied search time is to perform a gradient search outward from known valid points. Here, search reduction is obtained by commensurately reducing search diversity. It is claimed that this process is what enables most humans to solve inferential randomization problems such as this one, most of the time. The dual constraints of available search time on a given processor(s) vs. the generality of the candidate solution space serves to dynamically contract or expand the search space.

Notice that the process of randomization not only captures existing instances in a more compact form, but in so doing embodies similar instances, which may or may not be valid. The point is that by limiting the degree of generalization, one tightens the degree of analogy and in so doing, increases the chance of a valid inference. The inferences found to be valid are fed back to the randomization process. This results in a more delimited search space and provides for multiple analogies—increasing the subsequent chance for valid inferences. Moreover, the inference of grammars more general than regular grammars is inherently heuristic. The context-free grammar (CFG) is the lowest-level such grammar. All non deterministic grammars may be statistically augmented—resulting in stochastic grammars. Furthermore, where heuristics serve in the generation of new knowledge and that knowledge serves in the generation of new heuristics, the amplification of knowledge occurs by way of self-reference! Allowing for the (self-referential) application of knowledge bases, any practical methodology, serving in the discovery of these heuristics, must be domain-general to be cost effective. The transformative search for randomization is the most general such methodology because it extracts self-referential knowledge from conditional as well as procedural knowledge in context.

III. Problem Description

The problem is to detect a cyber attack when it happens and recover from a cyber attack while it happens. Method 10 subdivides software into components, which map a set of input vectors to a non deterministic set of stochastic output vectors. Components are defined in terms of other components, which are defined by rules.

Figure 2:
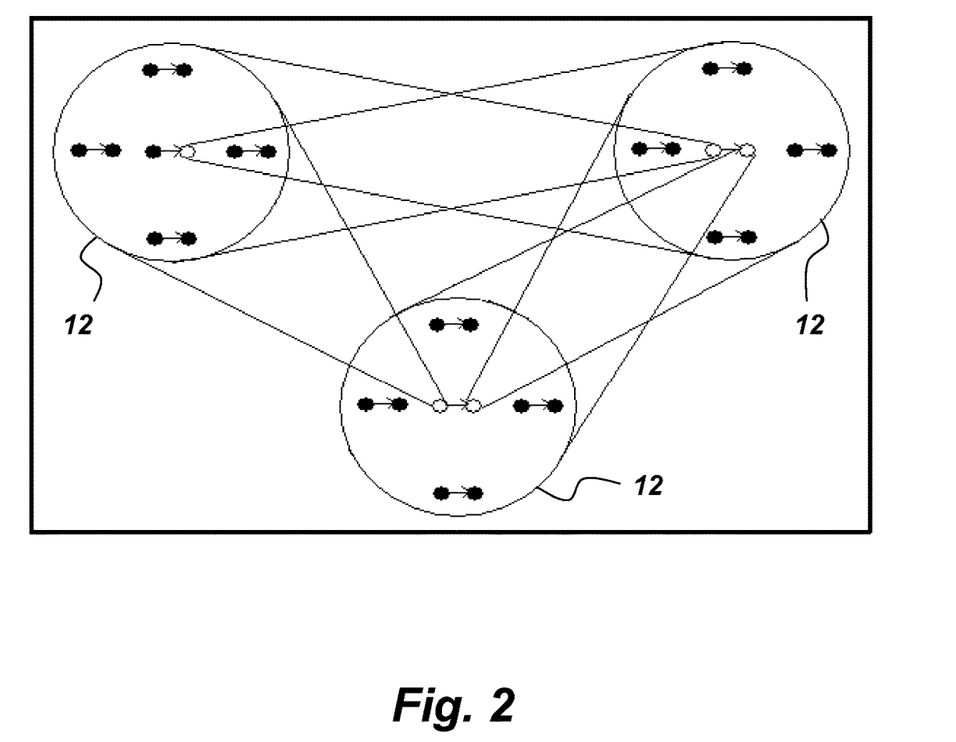
FIG. 2 is a graphical illustration of software components.

FIG. 2 is a graphical illustration of software components 12 having a recursive, rule-based definition. The behavior of a set of Boolean components 12 or a sequence of procedural components is not unique. Thus, it is possible to synthesize a diverse set of components, which provides the desired security for an arbitrary I/O characterization.

A. Justification for I/O Characterization of Software Components

It is acknowledged that there is software, which cannot be sufficiently characterized by a non-deterministic stochastic I/O mapping. For example, a component might draw a picture. Here, a knowledge-based system may be applied to rank the quality of the component. In a sense, mapping input to desired output(s) is universal—it's just that intermediate evaluation code is sometimes needed. Thus, while we will not address such complexities here, it is to be understood that the methodology advanced herein is completely compatible with them. In fact, method 10 may be used to define the intermediate knowledge-based evaluation systems.

Another point of contention pertains to the use of empirical testing instead of, or in combination with, denotational or axiomatic semantics for program validation. The recursive Unsolvability of the Equivalence Problem, as presented in D. Song, M. Reiter, and S. Forrest, *Taking Cues from Mother Nature to Foil Cyber Attacks*, NSF PR 03-130, https://www.nsf.gov/od/lpa/news/03/pr031, Nov. 25, 2003 (hereinafter referred to as Song), proves that in the general case it is impossible to prove that two arbitrary programs compute the same function. Moreover, approaches to program validation based on computational semantics have proven to be unacceptably difficult to apply in practice. There can be no theoretical method for insuring absolute validity once a program grows to a level of complexity to be capable of self-reference.

It follows that program validation is properly based on empirical testing, the goal of which is to cover a maximal number of execution paths using a minimal number of test cases. This is none other than randomization. Of course, there is no need to achieve the absolute minimum here—a minimum relative to the search time required to find the test cases will suffice. In a large enough system of systems, the methodology advanced herein may be applied to the generation of relatively random test cases. Randomization serves to maximize reuse. Reuse is perhaps the best real-world technique for exposing and thus minimizing the occurrence of program bugs.

B. Random-Basis Testing

In method 10, each component saved in the database is associated with one or more I/O test vector pairings that serve to map a random input vector to correct non deterministic output vectors. The underpinning principle is that test vectors, which have been sufficiently randomized, are relatively incompressible. For example, consider the synthesis of a sort function using LISP programming shown below.

```
((DEFUN MYSORT (S)
   (COND ((NULL S) NIL)
      (T (CONS (MYMIN S (CAR S)) (MYSORT (REMOVE
      (MYMIN S(CAR S)) S)))))))
? io
((((1 3 2)) (1 2 3)) (((3 2 1)) (1 2 3)) (((1 2 3)) (1 2 3)))
? (pprint (setq frepos '((CRISPY'
      (DEFUN MYSORT (S)
      (COND
      (FUZZY
         ((NULL S) NIL)
         ((ATOM (FUZZY S ((FUZZY CAR CDR) S))) NIL))
      (T (CONS (MYMIN S (CAR S))
      (MYSORT (REMOVE (MYMIN S (CAR S)) S)))))))))
((CRISPY '(DEFUN MYSORT (S)
   (COND (FUZZY ((NULL S) NIL) ((ATOM (FUZZY S
   ((FUZZY CAR CDR) S))) NIL))
      (T (CONS (MYMIN S (CAR S)) (MYSORT
      (REMOVE (MYMIN S (CAR S)) S))))))))
; Note that (ATOM S) was automatically programmed
using the large fuzzy function space.
? (pprint (auto frepos io))
((DEFUN MYSORT (S)
   (COND ((ATOM S) NIL)
      (T (CONS (MYMIN S (CAR S)) (MYSORT
      (REMOVE (MYMIN S (CAR S)) S))))))
; Note that each run may create syntactically different,
but semantically equivalent functions:
? (pprint (auto frepos io))
((DEFUN MYSORT (S)
   (COND ((NULL S) NIL)
      (T (CONS (MYMIN S (CAR S)) (MYSORT (REMOVE
      (MYMIN S (CAR S)) S))))))
```

There are some extraneous details such as knowing when a particular sequence will lead to a stack overflow, but these may be resolved using an allowed execution time parameter. Impressive programs have been so synthesized—supporting the component-based concept. Notice that components can be written at any scale—from primitive statements to complex functions. Given only so much allocated search time, the system will either discover a solution or report back with failure. This is in keeping with the recursive Unsolvability of the Halting Problem as described by Song and R. Solomonoff, "A New Method for Discovering the Grammars of Phrase Structure Languages," *Proc. Int. Conf. Information Processing*, UNESCO Publishing House, Paris, France, pp. 285-290, 1959 (hereinafter referred to as Solomonoff).

With reference to the sort function synthesis above, consider such I/O constraints as (((3 2 1) (1 2 3)) ((3 1 2) (1 2 3))). That is, when (3 2 1) is input to the sort function, it is required to output (1 2 3). Similarly, when (3 1 2) is input to it, it is required to output the same. Clearly, there is little value in using a test set such as (((1) (1)) ((2 1) (1 2)) ((3 2 1) (1 2 3)) ((4 3 2 1) (1 2 3 4)) . . . ). The problem here is that this test set is relatively symmetric or compressible into a compact generating function. A fixed-point or random test set is required instead and the use of such relatively random test sets is called, random-basis testing. While the need for functional decomposition remains, under random-basis testing, the complexity for the designer is shifted from writing code to writing search schema and relatively random tests. For example, such a test set here is (((1) (1)) ((2 1) (1 2)) ((3 1 2) (1 2 3)) ((1 2 3) (1 2 3))). Many similar ones exist. One may also want to constrain the complexity of any synthesized component (e.g., Insertion Sort, Quicksort, et al.). This can be accomplished through the inclusion of temporal constraints on the I/O behavior (i.e., relative to the executing hardware and competing software components).

C. Component Definition

There are two categories of components—Boolean components, which return True or False and procedural components, which compute all other functions and can post and/or retract information to/from a blackboard. In an embodiment of method 10, there are two blackboards—a local blackboard, which is only accessible to local component functions and procedures as well as those invoked by them and a global blackboard, which is accessible to all component functions and procedures. The blackboards dynamically augment the input vectors to provide further context.

All components are composed of rules, each of which consists of one or a conjunction of two or more Boolean components, which imply one or a sequence of two or more, procedural components—including global and local RETRACT and POST. Given an input vector and corresponding output vector(s), the rule base comprising the component must map the former to that latter at least tolerance percent of the time. The default tolerance is 100 percent. Transformation may also favor the fastest component on the same I/O characterization. Notice that greater diversification comes at an allowance for less optimization.

D. Component Synthesis

A library of universal primitive and macro components is supplied and evolved. There are three ways that these are retrieved. First, is by name. Second is by mapping an input vector closer, by some definition (e.g., the 2-norm et al.), to a desired non deterministic output vector (i.e., hill climbing—non contracting transformations reducing the distance to a goal state with each substitution). Third is just by mapping the input vector using contracting and non contracting transformations (i.e., Type 0 transformation). Hill climbing and Type 0 transformation may be combined and occur simultaneously until interrupted. The former accelerates reaching a desired output state, while the latter gets the system off of non-global hills. Macro components are evolved by chance. They comprise a Very High Level Language (VHLL). For example, a macro component for predicting what crops to sow will no doubt invoke a macro component for predicting the weather. Similarly, a macro component for planning a vacation will likewise invoke the same macro component for predicting the weather (i.e., reuse). Test vectors are stored with each indexed component to facilitate the programmer in their creation and diversification as well as with the overall understanding of the components function. While increasing the number of software tests is generally important, a domain-specific goal is to generate mutually random ordered pairs. Components in satisfaction of their I/O test vectors are valid by definition. Non deterministic outputs are not stochastically defined for testing as it would be difficult to know these numbers as well as inefficient to run such quantitative tests.

As software gets more complex, one might logically expect the number of components to grow with it. Actually, the exact opposite is true. Engineers are required to obtain tighter integration among components in an effort to address cost, reliability, and packaging considerations, so they are constantly working to decrease the number of software components but deliver an ever-expanding range of capabilities. Thus, macro components have great utility. Such randomizations have an attendant advantage in that their use—including that of their constituent components—implies their increased testing by virtue of their falling on a greater number of execution paths. The goal here is to cover the maximum number of execution paths using the relatively fewest I/O tests (i.e., random-basis testing).

The maximum number of components in a rule, as well as the maximum number of rules in a component, is determined based on the speed, number of parallel processors for any fixed hardware capability, and the complexity of processing the I/O vectors. It is assumed that macro components will make use of parallel/distributed processors to avoid a significant slowdown. Components that are not hierarchical are quite amenable to parallel synthesis and testing. Components may not recursively (e.g., in a daisy chain) invoke themselves. In method 10 this may be checked at definition time through the use of an acyclic stack of generated calls. Searches for component maps are ordered from primitive components to a maximal depth of composition, which is defined in the I/O library. This is performed to maximize speed of discovery. The components satisfying the supplied mapping characterization are recursively enumerable.

Software engineers can supply external knowledge, which is captured for the specification of components. Components are defined using a generalized language based on disjunction. This is because it is easier to specify alternatives (i.e., schemas) in satisfaction of I/O constraints than to specify single instances (e.g., A|B→C than A→C|B→C; or, A→B|C than A→B|A→C). Moreover, such an approach facilitates the automatic re-programming of component definitions in response to the use of similar I/O constraints. The idea is to let the CPU assume more of the selection task by running a specified number of rule alternates against the specified I/O constraints. This off-loads the mundane work to the machine and frees the software engineer in proportion to the processing speed of the machine. Here, the software engineer is freed to work at the conceptual level; while, the machine is enabled to work at the detailed level. Each is liberated to do what it does best. The number of (macro) Boolean components, (macro) procedural components, and alternate candidate rules is determined by the ply of each and the processing speed of the machine. Notice that the task of programming component rules is thus proportionately relaxed. Programming is not necessarily eliminated; rather, it is moved to ever-higher levels. This is randomization. Furthermore, component-type rule-based languages have the advantage of being self-documenting (e.g., IF "Root-Problem" THEN "Newton-Iterative-Method"). Novel and efficient development environments can be designed to support the pragmatics of such programming.

Each run may synthesize semantically equivalent (i.e., within the limits defined by the I/O test vectors), but syntactically distinct functions (e.g., see the alternative definitions for MYSORT at the bottom of the sort function synthesis above). Similar diversified components are captured in transformation rules. Thus, initially diversified components are synthesized entirely by chance, which of course can be very slow. Chance synthesis is a continual on-going process, which is necessary to maintain genetic diversity. But, once transformation rules are synthesized, they are applied to constituent component rules to create diversified components with great rapidity. The 3-2-1 skew may be applied to favor the use of recently acquired or fired transformation rules. It uses a logical move-to-the-head ordered search based upon temporal locality. The acquisition of new components leads to the acquisition of new transforms. Note that if the system sits idle for long, it enters dream mode via the 3-2-1 skew. That is, it progressively incorporates less recently acquired/fired transforms in the search for diversified components.

Transformation rules can be set to minimize space and/or maximize speed and in so doing generalize/optimize. Such optimizations are also in keeping with Occam's Razor, which states that in selecting among competing explanations of apparent equal validity, the simplest is to be preferred. If, after each such transformation, the progressively outer components do not properly map their I/O characterization vectors, then it can only be because the pair of components comprising the transformation rule is not semantically equivalent. In this case, the transformation is undone and the transformation rule and its substituted component are expunged (i.e., since it has an unknown deleterious I/O behavior). This allows for a proper version to be subsequently re-synthesized. Components having more-specific redundant rules have those rules expunged.

Convergence upon correct components and thus correct transforms is assured. This is superior to just using multiple analogies as it provides practical (i.e., to the limits of the supplied test vectors) absolute verification at potentially multiple component levels. Such validation is not in contradiction with the Incompleteness Theorem (as described in V. A. Uspenskii's work *Godel's Incompleteness Theorem*) as the test vectors are always finite as is the allowed runtime.

E. Non Monotonic Rules

Non monotonic rules are secondary rules, which condition the firing of primary rules. They have the advantage of being highly reusable—facilitating the specification of complex components. Reuse is a tenet of randomization theory. Both local and global blackboards utilize posting and retraction protocols. The scope of a local blackboard is limited to the originating component and all components invoked by it. For example, {Laces:Pull untied laces,Tie:Make bow}→GRETRACT:(Foot-ware:Shoes are untied);GPOST:(Foot-ware:Shoes are tied)　　(4)

The order of the predefined, global and local RETRACT and POST procedures is, akin to all procedural sequences, immutable.

F. Component Redundancy and Diversification

The pattern-matching search known as backtracking can iteratively expand the leftmost node, or the rightmost node on Open. Results here are not identical, but are statistically equivalent. If one component is provided with one expansion search parameter, the other component must be provided with the same search parameter, or the resultant dual-component search will have some breadth-first, rather than strictly depth-first characteristics. This will change the semantics resulting from the use of large search spaces. Clearly, components need to be transformed with due regard for subtle context to preserve their aggregate semantics. These semantic differences become apparent on input vectors, which are outside of those used for I/O definition. Their use can result in erroneous communications via the local and/or global blackboards. The system of systems, described in the technical approach below, evolves such context-sensitive components and their transformations.

Systems employing method 10 can potentially provide exponentially more security than can a multi-compiler by finding multiple paths from start to goal states. Under syntactic differentiation, achieving the same results implies computing the same component semantics. Under transformational equivalence, one need not compute the same exact component semantics—only ones that achieve the same results in the context of other components. Given sufficiently large problem spaces and sufficient computational power, exponential increases in cyber security can thus be had.

Syntactic differentiation can at best provide only linear increases in cyber security. Thus, the proposed methodology offers far greater security against cyber attacks than can conventional approaches.

The transformational process converges on the synthesis of syntactically distinct components, which are, to the limits of testing, semantically equivalent. Such components can be verified to be free from attack if their I/O synthesis behavior is within the specified tolerance. Even so, multiple "semantically equivalent" components may compute different output vectors on the same, previously untested input vectors. Here, diversity enables the use of multiple functional analogies by counting the number of diverse components yielding the same output vector. It also allows for a count of the approximate number of recursively enumerable distinct paths leading to the synthesis of each component. This multiple analogies of derivation, when combined with multiple functional analogies, provide a relative validity metric for voting the novel output vectors. These solution vectors are very important because they evidence the system capability for learning to properly generalize by way of exploiting redundancy (i.e., in both function and derivation). Furthermore, having multiple derivations provides stochastic non deterministic probabilities. This lies at the root of human imagination and knowledge.

IV. Technical Approach

The more constrained the search for knowledge, not only the faster that knowledge may be discovered, but the faster heuristics aiding in the discovery of that knowledge may be obtained as well. An embodiment of method 10 may be described as a system of systems randomization methodology. To this point, redundancy and diversification have been discussed in the context of detecting and recovering from a cyber attack as well as in the inductive prediction of outputs for inputs not previously supplied.

Figure 3:
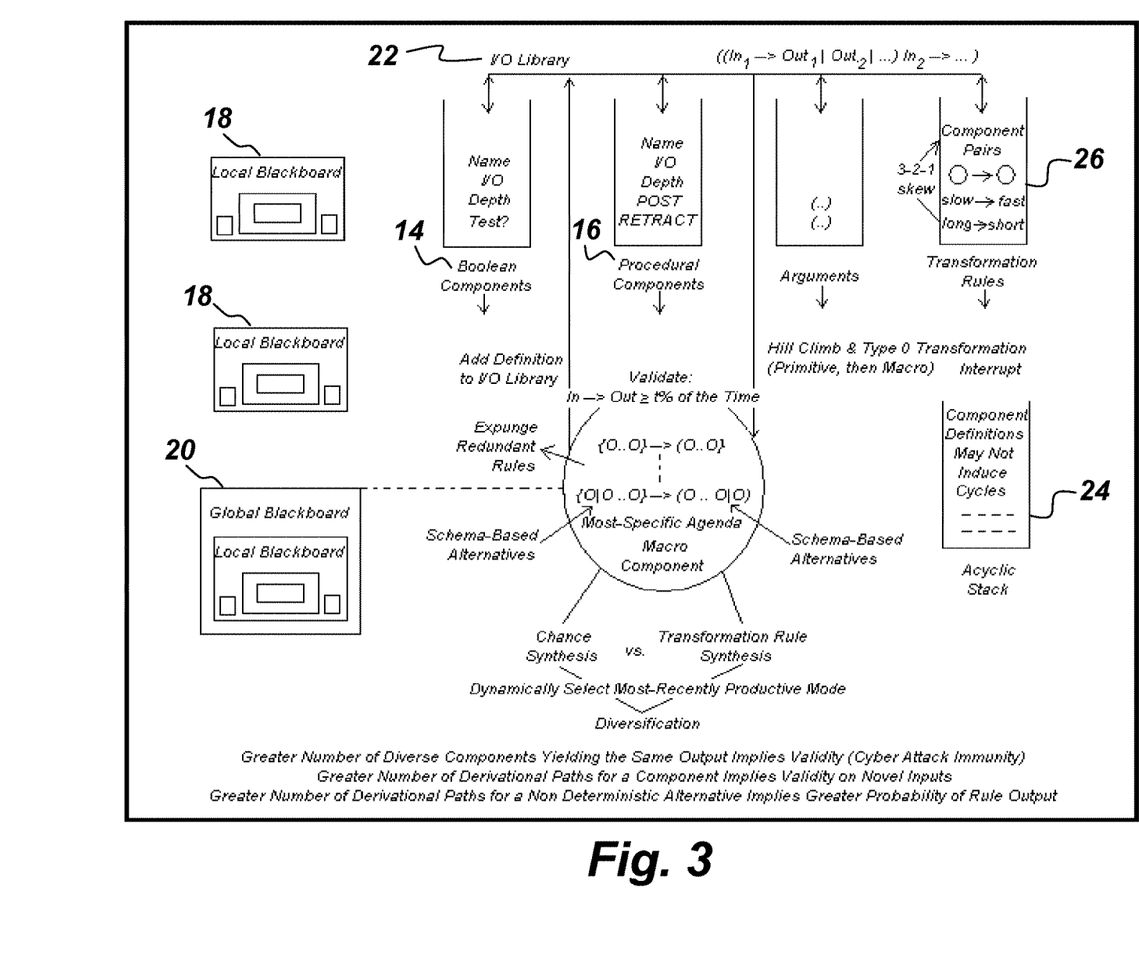
FIG. 3 is a block diagram of a system of systems randomization methodology.

FIG. 3 is a block diagram of a system of systems randomization methodology embodiment of method 10. The following is shown in FIG. 3:

1. There are two categories of components—Boolean components 14, which return True or False and procedural components 16, which compute all other functions. There are two blackboards—a local blackboard 18 and a global blackboard 20, which is accessible to all component functions and procedures. The blackboards dynamically augment the input vectors to provide further context. Two special predefined components are the non monotonic global and local RETRACT and POST procedures. Each carries a single well-defined argument found in the I/O library. The scope of a local blackboard is limited to the originating component and all components invoked by it. The global blackboard is visible to all components. Postings and retractions should be made by the most primitive level component as is practical (i.e., having the lowest maximal depth of composition) to facilitate efficiency and validity (i.e., minimizing the potential for deleterious side effects).
2. All components are composed of rules, each of which consists of one or a conjunction of two or more Boolean components, which imply one or a sequence of two or more, procedural components—including global and local RETRACT and POST. Given an input vector and corresponding output vector(s), the rule base comprising the component must map the former to that latter at least tolerance percent of the time. The default tolerance, t, is 100 percent. A Boolean speed of computation compiler directive, s, when set means that the direction of transformation favors the component performing at least as fast on the same I/O characterization vectors. A Boolean space of computation compiler directive, a, is similar.
3. A library 22 consisting of at least universal primitive and macro components is supplied. I/O test vectors and the maximal depth of composition are stored with each indexed component. Components may be retrieved by name, by mapping an input vector closer, by some definition (e.g., the 2-norm et al.), to a desired non deterministic output vector (i.e., hill climbing—non contracting transformations reducing the distance to a goal state with each substitution), and/or by mapping the input vector (i.e., Type 0 transformation—contracting and non contracting transformations). Hill climbing and Type 0 transformations are interleaved, since each can benefit the other. Search is terminated upon interrupt.
4. Macro components are evolved by chance. Basically, Boolean and procedural components are selected from the library 22 at chance and combined into defining rules based on software engineer defined schemas (see below). Set the maximum number of components in a rule and the maximum number of rules in a component—at the primitive level. The maximum number of such components and such rules is determined by the software engineer in consideration of the capabilities of the executing hardware, the complexity of processing the I/O vectors, and any supplied external knowledge (see below). These maximums will need to respect macro components if a sufficient number of parallel processors cannot be had. This may be accomplished by dividing this number by the maximal depth of composition found in the I/O library 22. The process iterates until the supplied I/O vectors are properly mapped within the specified tolerance, or an interrupt signals failure to do so (whereupon the software engineer may modify the search specification, or abandon it). Components may not recursively (e.g., in a daisy chain) invoke themselves. This is checked at definition time through the use of an acyclic stack 24 of generated calls. Once evolved, macro components are added to the I/O library 22. All else being equal, search primitive components before macro components, as recursively defined (referring to the maximal depth of composition in the I/O library), for effective I/O maps.
5. Components are defined using a generalized language based on disjunction. This is because it is easier to specify alternatives (i.e., schemas) in satisfaction of I/O constraints than to specify single instances (e.g., A|B→C than A→C| B→C; or, A→B|C than A→B|A→C). The number of (macro) Boolean components, (macro) procedural components, and alternate candidate rules is determined by the ply of each and the processing speed of the machine. Furthermore, component-type languages have the advantage of being self-documenting (e.g., IF "Root-Problem" THEN "Newton-Iterative-Method"). Novel and efficient development environments can be designed to support the pragmatics of such programming.
6. Synthesize components in satisfaction of the I/O test vectors and s, a, and t by chance. Such synthesis may lead to diverse components computing the same function. Pairings of such components form transformation rules, which are saved in a separate base 26 and dynamically ordered using the 3-2-1 skew. Rules are logically moved to the head of their list upon acquisition or firing. Convergence upon correct components, and thus correct transforms, and so on follows with scale. A most-specific first agenda mechanism controls the firing of component rules. Redundant rules, having a more-specific (i.e., superset) of Boolean components, are expunged. The direction of transformation is determined by compiler directives, based on s, a, and t. Use of the s and/or a optimization directives minimizes the potential for diversification. Conversely, decreasing the t generalization directive maximizes the potential for diversification.

7. Diverse components are constructed by transformation, which in turn depends on random component synthesis as a source of transformation rules. The relative time spent (processors allocated) for each is dynamically given as follows. Let, r(t) give the number of novel transformation rules yielded by components synthesized by chance, over some timeframe, t. Let, x(t) give the number of novel component rules yielded by transformation rules, over some timeframe, t. (Note that it could potentially reduce the diversity space; and, it is otherwise redundant to self-apply transformation rules.) Then, the percent of time/resources to be spent in transformation rule synthesis is given by $$\frac{r(t)+1}{r(t)+x(t)+2};$$

while, the percent of time/resources to be spent in component rule synthesis is given by $$\frac{x(t)+1}{r(t)+x(t)+2},$$

where if r(t)+x(t)=0, t is doubled else t is halved. The value t is initialized to 1.0. Thus, time/resources are proportionately spent where they were most-recently productive.

8. The 3-2-1 skew favors the use of recently acquired or fired transformation rules. Transformation rules are applied to the (symmetric) rules comprising a component to yield diversified components. Diversified components are realized using at least one diversified rule, which in turn, consists of at least one diversified component. Duplicate transformation rules are logically moved to their list head. Every component substitution is verified using the local and progressively higher I/O characterization vectors and invoking components. In case of failure, the involved component rule, the involved transformation rule, and the substituted component are expunged.

9. Components are verified to be free from attack if their I/O synthesis behavior is within the specified tolerance. Even so, multiple "semantically equivalent" components may compute different output vectors on the same, previously untested input vectors. Here, diversity enables the use of Multiple Functional Analogies (MFA) by counting the number of diverse components yielding the same output vector. It also allows for a count of the approximate number of recursively enumerable distinct paths leading to the synthesis of each component. This is approximated by the number of times that it is derived—including random and transformational synthesis. This Multiple Analogies of Derivation (MAD), when combined with the MFA, provide a Relative Validity Metric (RVM) for voting the novel output vectors. Using the 3-2-1 skew, components synthesized from more recently acquired/fired transformation rules are given a higher relative validity, since they are more likely to be repeatedly derived. This makes sense because these solutions are immediately needed (i.e., just in time synthesis) and not stored for possible future use. The MAD for the ith combination of Boolean components in a rule is given by:

$$MAD(i) = \frac{\text{card}\{\text{component}_i \text{synthesis}\}}{\left(\sum_{j=1}^{|components|} \text{card}\{\text{component}_j \text{synthesis}\}\right) / |\text{components}|} \quad (5)$$

The greater the MAD, the more likely the novel output vector is to be valid. The MFA for the ith combination of Boolean components in a rule is given by:

$$MFA(i) = \frac{\sum_{k=1}^{NDO} \text{card}\{\text{component}_{j,k} \text{outputs}\}}{\sum_{k=1}^{NDO} \left(\sum_{j=1}^{|components|} \text{card}\{\text{component}_{j,k} \text{outputs}\} / |\text{components}|\right) / NDO} \quad (6)$$

where NDO is the number of non deterministic outputs per component. Hence, the joint RVM for the ith combination of Boolean components in a rule is given by combining (5) and (6):

$$RVM(i) = MAD(i) \cdot MFA(i) \quad (7)$$

The greater the RVM, the more likely the output is to be valid. Validity is associated with an RVM>1. Absolute component validity is predicated on testing as absolute validity is not necessarily provable.

10. Non deterministic procedural alternatives are defined to be a member of the specified output vectors. The probability of each distinct alternative is directly proportional to the number of paths for its synthesis. This, in turn, is approximated by the number of times that it is derived—including random and transformational synthesis. Thus, the dynamic stochastic probability for the jth non deterministic selection for the ith combination of Boolean components in a rule is given by:

$$nondetprob(i, j) = \frac{\text{card}\{\text{procedural}_j \text{synthesis}\}}{\sum_{k=1}^{NDO} \text{card}\{\text{procedural}_k \text{synthesis}\}} \quad (8)$$

where NDO is the number of non deterministic outputs.

This methodology may be proven to be immune to cyber attack by two routes. First, it will be demonstrated that a significant percentage of components can be corrupted and the system of systems will autonomously discover and report this occurrence and still return correct outputs. Second, it will be demonstrated that the system of systems can generalize I/O maps in the form of diverse components that can usually properly map previously unseen inputs to correct outputs. This is accomplished by supplying the I/O vectors from a system employing method 10, and letting the system learn diverse component maps, supplying novel input vectors for similar problems—correct output vectors for which have never been supplied, and seeing if the system converges on finding correct non deterministic output vectors.

Contemporary components for a system employing method 10 may be taken from select newLISP functions used for the realization of the methodology (e.g., bootstrapping). The system of systems will automatically generate diverse components from them. The performance of the system, may be rated as a function of scale. It will be shown that the inferential error rate is inversely proportional to scale. That is, the larger the domain-specific component base and the more processing power/time allocated, the lower the inferential error rate. A cost-benefit analysis of the protection provided by component diversification may be provided based on an empirical study and projection of its scalability.

Computer systems are increasingly subject to operation in hostile environments, where cyber attack is just a click away. The cost of combining redundancy and component diversity is justified by the cost of security failures in such systems. The greater the multiplicity of components derived through chance and transformation, the greater their individual reliabilities will be through the use of multiple analogies. Chance and ordered transformation are dynamically balanced in the definition of diverse components. Communication occurs, using non monotonic components, through both a global and local blackboards. Although the methodology of method 10 is self-referential, it is not subject to the limitations imposed by the Incompleteness Theorem. This is because it is inherently heuristic—not logical in nature. A divergent multiple-analogies approach to component synthesis underpins method 10. A theoretical consequence of this heuristic approach is that all non-trivial learning systems must embody an allowance for inherent error in that which may be learned.

Method 10 may be realized in a system for the generation of symmetric software for countering cyber attacks. The problem here pertains to the acquisition of components along with a methodology for mapping supplied input vectors to one or more desired stochastic output vectors. These maps need to be diverse to thwart cyber attacks as well as to allow for the use of multiple analogies to better predict the (non deterministic) mapping of previously unknown inputs. This methodology may be realized in newLISP (in view of its superior list processing capabilities) as a system of systems. It may be tested for relative immunity against cyber attacks. It may also be tested against a sequence of progressively more complex problems for which no solution has been pre-programmed. Finally, the performance of the system (i.e., the inferential error rate) is tied to the size of the transformational base as well as the processing power/time allocated in conjunction with the schema-definition language.

Figure 4:
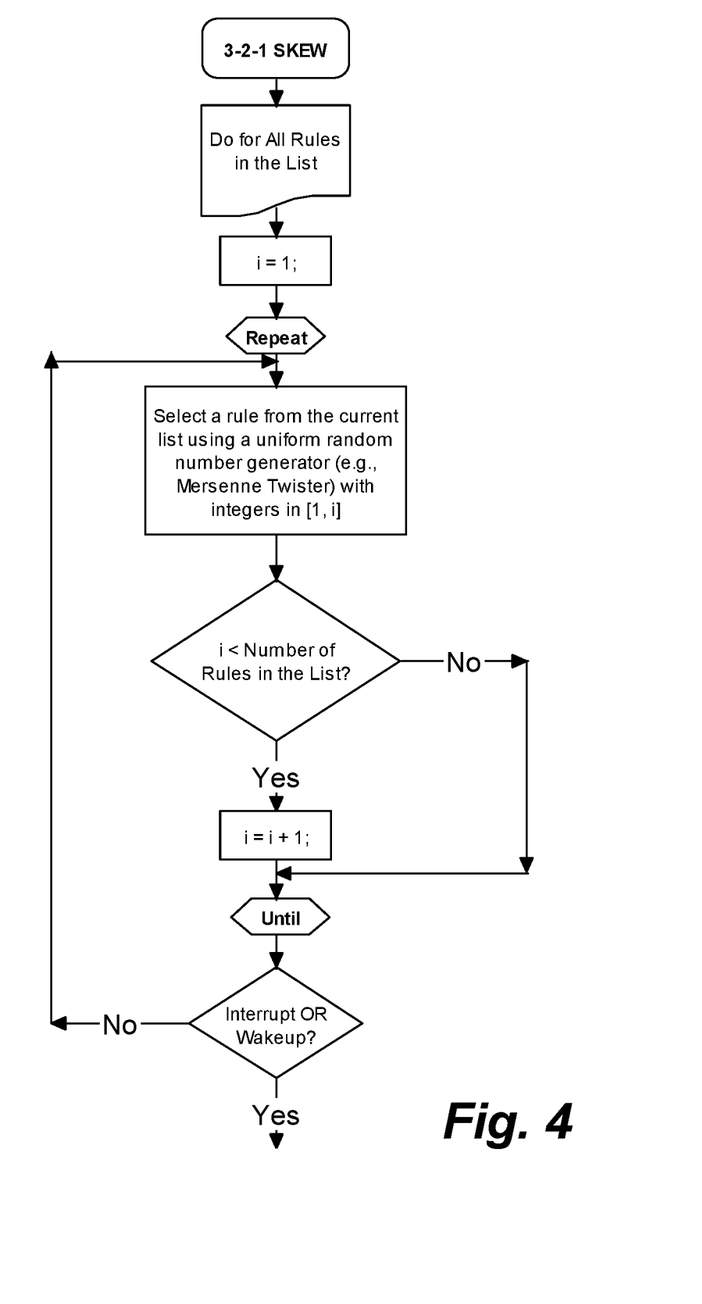
FIG. 4 is a flowchart of a 3-2-1 skew for dynamic selection in a list.

FIG. 4 is a flowchart of a 3-2-1 skew for dynamic selection in a list. The 3-2-1 skew is a simple (fast) methodology for assigning knowledge relative weights on the basis of Denning's principle of temporal locality. This is not described in V. A. Uspenskii, *Godel's Incompleteness Theorem*. More recent knowledge tends to be proportionately more valuable. This skew is used to increase the likelihood of solving a problem by taking full advantage of the current operational domain profile. Knowledge is acquired at the logical head and moved there when fired. It is also expunged from the logical tail when necessary to release space. The selection of a particular skew is domain specific. For example, the rate of radioactive decay is known to be proportional to how much radioactive material is left (excluding the presence of certain metals). The nuclear decay equation may be used as a skew for various radioactive materials and is given by $A(t)=A_0 e^{-\lambda t}$. Here, $A(t)$ is the quantity of radioactive material at time t, and $A_0=A(0)$ is the initial quantity. The variable $\lambda$ (lambda) is a positive number (i.e., the decay constant) defining the rate of decay for the particular radioactive material. A countably infinite number of other skews may be applicable.

Still referring to FIG. 4, in the following assignment of skew-weights, the skew vector, S, favors the logical head of the list in keeping with temporal locality. Rules, which were most-recently acquired or fired, and thus appear at or nearer to the logical head of a list, are proportionately more heavily weighted under the 3-2-1 skew. Of course, this differs from a uniform skew. The closer a case is to the top of its linked list, the greater its weight or importance. A heuristic scheme (i.e., the 3-2-1 skew) for achieving this with a dependency category consisting of r rules is to assign the head rule a weight of $$\frac{2r}{r(r+1)}.$$

The map just below the head map has a weight of $$\frac{2(r-1)}{r(r+1)}.$$

Finally, the tail map of the list has a weight of $$\frac{2}{r(r+1)}.$$

The ith map from the head has a weight of $$\frac{2(r-i+1)}{r(r+1)},$$

for i=1, 2, . . . , r. For example, using a vector of four weights, the 3-2-1 skew (S) is $S=(0.4, 0.3, 0.2, 0.1)^T$. There are a countably infinite number of possible skews, such that $\Sigma s_k=1.0$. The evaluation of the members of a dependency category is the contiguous weighted sum of its constituent elements. A 3-2-1 skew is defined where the ith map from the head has a weight of $$\frac{2(r-i+1)}{r(r+1)},$$

for i=1, 2, . . . , r; where, r specifies the number of rules in the skew. The use of the 3-2-1 skew is optional (i.e., in comparison with uniform weighting) and is useful for domains where the value of the data deteriorates in linear proportion to its time of collection—valuing more recent data, more highly. The use of additional time-dependent weights, depending on whether there is an additional time dependency of the value of the knowledge, is also possible.

From the above description of the method 10 for protecting a software system against cyber attacks, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

I claim:

1. A method for protecting a software system against cyber attacks comprising the following steps:
   subdividing the software system into components, wherein each component maps a set of input vectors to a non-deterministic set of stochastic output vectors;
   saving the components in a database;
   testing the software system by associating each component in the database with at least two mutually random input/output (I/O) test vector pairs that serve to map a random input vector to correct a non deterministic output vector;
   storing I/O test vectors with their respective component, wherein components in satisfaction of their I/O test vectors are valid by definition;
   expunging components having invalid output vectors;
   synthesizing the components by providing a library of universal primitive and macro components, wherein the macro components comprise a Very High Level Language (VHLL) and are evolved in satisfaction of specified constraints; and
   retrieving the universal primitive and macro components in one of three ways:
      by name,
      by mapping an input vector closer to a desired non deterministic output vector, and
      by mapping an input vector using contracting and non contracting transformations.

2. The method of claim 1, wherein the mapping an input vector closer to a desired non deterministic output vector is performed by hill-climbing through only non contracting transformations that reduce a distance to a goal state with each transformation.

3. The method of claim 2, wherein the mapping an input vector using contracting and non contracting transformations is accomplished with Type 0 transformations, wherein the hill-climbing and the Type 0 transformations are combinable and occur simultaneously until interrupted, whereby the hill climbing accelerates reaching a desired output state and the Type 0 transformations gets the software system off of non-global hills.

4. The method of claim 1, wherein each component is defined recursively by rules in terms of other components.

5. The method of claim 4, wherein each component is either a Boolean functional component or a procedural component and wherein each rule comprises one or a conjunction of two or more Boolean components, which imply one or a sequence of two or more procedural components.

6. The method of claim 5, wherein each component is further defined using generalized language based on disjunction.

7. The method of claim 6, further comprising the step of constraining complexity of any synthesized component by including temporal constraints on the I/O behavior of the synthesized component relative to executing hardware and competing software components.

8. The method of claim 7, wherein similar diversified components are captured in transformation rules, and wherein once transformation rules are synthesized, they are applied to constituent component rules to create diversified components, and further comprising the step of applying a 3-2-1 skew to favor the use of recently acquired or fired transformation rules by using a logical move-to-the-head ordered search based upon temporal locality whereby the acquisition of new components leads to the acquisition of new transforms.

9. A method for protecting a software system against cyber attacks comprising the following steps:
   subdividing the software system into Boolean components and procedural components, wherein the Boolean components return True or False, and the procedural components compute all other functions of the software system, wherein each component maps a set of input vectors to a non-deterministic set of stochastic output vectors;
   saving the components and the input and output vectors in a database;
   providing a library of universal primitive and macro components, wherein input and output (I/O) test vectors and a maximal depth of composition are stored with each component;
   synthesizing components in satisfaction of the I/O test vectors such that diverse components compute the same function;
   pairing diverse components that compute the same function as transformation rules, which are saved in a separate base and dynamically ordered using a 3-2-1 skew;
   verifying that components are free from attack if their I/O synthesis behavior is within a specified tolerance;
   using Multiple Functional Analogies (MFA) by counting the number of diverse components yielding the same output vector;
   using Multiple Analogies of Derivation (MAD) by counting an approximate number of recursively enumerable distinct paths leading to the synthesis of each component, wherein the approximate number of recursively enumerable distinct paths is equal to the number of times that a given component is derived including random and transformational synthesis;
   providing a Relative Validity Metric (RVM) by combining MAD and MFA numbers, wherein the greater the RVM, the more likely the output is to be valid, and wherein validity is associated with an RVM>1; and
   expunging a given component from the software system if a given component has an RVM that is less than 1.

10. The method of claim 9, wherein each component comprises rules, each rule consisting of one or a conjunction of two or more Boolean components, which imply one or a sequence of two or more procedural components such that given an input vector and corresponding output vector(s), a rule base comprising the corresponding component must map the former to that latter at least tolerance t percent of the time.

11. The method of claim 10 wherein a default tolerance, t, is 100 percent, a Boolean speed and space of computation compiler directive, s and a respectively, when set means that the direction of transformation favors the component performing at least as fast on the same I/O characterization vectors.

12. The method of claim 11, wherein Boolean and procedural components are selected from the I/O library randomly and combined into defining rules based on human-defined schemas such that the macro components are evolved randomly, and, once evolved, macro components are added to the I/O library.

13. The method of claim 12, wherein components are defined using a generalized language based on disjunction.

14. The method of claim 13, wherein rules are logically moved to the head of their list upon acquisition or firing which leads to convergence upon correct components, and thus correct transforms, wherein a most-specific first agenda mechanism controls the firing of component rules such that redundant rules, having a more-specific (i.e., superset) of Boolean components, are expunged, and wherein the direction of transformation is determined by compiler directives, based on s, a, and t.

15. The method of claim 14, wherein diverse components are constructed by transformation, which in turn depends on random component synthesis as a source of transformation rules, wherein the relative time spent (processors allocated) for each transformation is dynamically given as follows:
let r(t) give the number of novel transformation rules yielded by components synthesized randomly, over some timeframe, t;
let, x(t) give the number of novel component rules yielded by transformation rules, over some timeframe, t;
wherein the percent of time/resources to be spent in transformation rule synthesis is given by $$\frac{r(t)+1}{r(t)+x(t)+2};$$

while, the percent of time/resources to be spent in component rule synthesis is given by $$\frac{x(t)+1}{r(t)+x(t)+2},$$

where if r(t)+x(t)=0, t is doubled else t is halved; and t is initialized to 1.0 whereby time/resources are proportionately spent where they were most-recently productive.

16. The method of claim 15 wherein the 3-2-1 skew favors the use of recently acquired or fired transformation rules, wherein transformation rules are applied to create symmetric knowledge comprising a component to yield diversified components, wherein diversified components are realized using at least one diversified rule, which in turn, consists of at least one diversified component, wherein duplicate transformation rules are logically moved to their list head; wherein every component substitution is verified using the local and progressively higher I/O characterization vectors and invoking components, and wherein in case of failure, the involved component rule, the involved transformation rule, and the substituted component are expunged.

17. The method of claim 16, further comprising the step of using the 3-2-1 skew to give a higher relative validity to components synthesized from more recently acquired/fired transformation rules since they are more likely to be repeatedly derived; wherein the MAD for an $i^{th}$ combination of Boolean components in a rule is given by:

$$MAD(i) = \frac{\text{card\{component}_i\text{synthesis\}}}{\left(\sum_{j=1}^{|components|} \text{card\{component}_j\text{synthesis\}}\right)/|components|},$$

wherein the MFA for the $i^{th}$ combination of Boolean components in a rule is given by:

$$MFA(i) = \frac{\sum_{k=1}^{NDO} \text{card\{component}_{j,k}\text{output\}}}{\sum_{k=1}^{NDO}\left(\sum_{j=1}^{|components|} \text{card\{component}_{j,k}\text{outputs\}|components|}\right)/NDO},$$

where the NDO is a number of non deterministic outputs per component, and wherein the joint RVM for the $i^{th}$ combination of Boolean components in a rule is given by combining the MAD and MFA numbers such that RVM(i)=MAD(i)·MFA(i).

18. A method for protecting a software system against cyber attacks comprising the following steps:
subdividing the software system into components, wherein each component maps a set of input vectors to a non-deterministic set of stochastic output vectors;
saving the components in a database;
creating dynamic transformation rules from component pairs to recursively increase reusable diversity;
synthesizing components randomly for on-going genetic diversity;
approximating a number of unique derivational paths (multiple analogies) with a number of paths synthesized randomly and/or through the use of dynamic transformation rules;
using the approximated number of derivational paths (multiple analogies) to determine a probability of a non deterministic stochastic output;
using the probability of a non deterministic stochastic output to select among competing alternatives;
deriving a relative validity metric by combining a number of diverse components yielding the same output vector with a number of redundant derivations;
employing a tolerance input/output (I/O) mapping relaxation metric and spatial/temporal optimization metrics to define each component;
searching for mapping component rule bases to supplied I/O constraints through hill climbing and Type 0 search;
employing random-basis testing in order to minimize the number of I/O constraints for maximal execution path coverage;
dynamically adjusting an amount of time spent in transformation rule synthesis and component rule synthesis to insure that time/resources are continually spent in proportion to where they were most-recently productive;
applying a 3-2-1 skew to synthesize components where they are most-likely to be needed based on temporal locality;
using an acyclic stack of generated calls to prevent the components from circularly invoking one another in their definitions;
storing the definitions of all components, their names, I/O characterizations, arguments, optimizations, and maximal depth of composition in I/O library;
ordering searches for component maps from primitive components to a maximal depth of composition to enable the most expeditious processing; and
determining whether a cyber attack has occurred by evaluating the relative validity metric.

* * * * *